US012123685B2

(12) United States Patent
Glick

(10) Patent No.: US 12,123,685 B2
(45) Date of Patent: Oct. 22, 2024

(54) BULLET RESISTANT GARAGE DOOR ASSEMBLY AND KIT THEREFOR

(71) Applicant: Amos B. Glick, Gap, PA (US)

(72) Inventor: Amos B. Glick, Gap, PA (US)

( * ) Notice: Subject to any disclaimer, the term of this patent is extended or adjusted under 35 U.S.C. 154(b) by 125 days.

(21) Appl. No.: 17/941,940

(22) Filed: Sep. 9, 2022

(65) Prior Publication Data

US 2023/0184518 A1 Jun. 15, 2023

Related U.S. Application Data

(63) Continuation-in-part of application No. 17/207,417, filed on Mar. 19, 2021, now Pat. No. 11,828,576.

(51) Int. Cl.

*F41H 5/013* (2006.01)
*E06B 3/48* (2006.01)
*E06B 5/10* (2006.01)
*F41H 5/04* (2006.01)
*F41H 5/24* (2006.01)

(52) U.S. Cl.

CPC ............. *F41H 5/013* (2013.01); *E06B 3/485* (2013.01); *E06B 5/10* (2013.01); *F41H 5/0471* (2013.01); *F41H 5/24* (2013.01)

(58) Field of Classification Search

CPC ........ F41H 5/226; F41H 5/045; E06B 3/7015; E06B 5/10; E06B 2003/7023; E06B 2003/7044; E06B 2003/7051
USPC .......................................................... 89/36.04
See application file for complete search history.

(56) References Cited

U.S. PATENT DOCUMENTS

| | | | | |
|---|---|---|---|---|
| 1,899,735 | A | 1/1932 | McClintock | |
| 5,429,340 | A | 7/1995 | Young | |
| 8,001,880 | B2 * | 8/2011 | White | F41H 5/24 404/6 |
| 10,012,479 | B2 | 7/2018 | Boviall | |
| 10,281,245 | B2 * | 5/2019 | DeKort | F41H 5/24 |
| 10,676,982 | B1 * | 6/2020 | Harris | E06B 3/485 |
| 11,814,896 | B1 * | 11/2023 | Velazquez | E06B 9/04 |
| 2009/0241422 | A1 * | 10/2009 | Mock | E06B 3/5892 52/204.53 |
| 2012/0090452 | A1 * | 4/2012 | Sudhakar | F41H 5/0457 70/237 |
| 2015/0354926 | A1 * | 12/2015 | Gibson | F41J 11/00 89/36.04 |

(Continued)

*Primary Examiner* — Samir Abdosh
(74) *Attorney, Agent, or Firm* — Miller Law Group, PLLC

(57) ABSTRACT

A ballistic garage door assembly and a kit for converting a standard garage door uses sheets of ballistic material secured to the exterior shell of the standard garage door panels along with inserts at the joints between adjacent garage door panels. Joint inserts applied to the horizontal ends of the garage door panels provide bullet resistant characteristics at the joints. Aluminum sheets with multiple plies of ballistic material between the aluminum sheets are applied to the entire garage door shell. Insulated foam is place on the innermost aluminum sheet to provide additional ballistic performance for the converted garage door. Increased levels of ballistic protection will utilize thicker aluminum panels and an additional external ballistic bumper to increase ballistic performance of the joints between the garage door panels. The outward aesthetic appearance of the garage door does not change appreciably, although a door lift with greater horsepower may be required.

24 Claims, 6 Drawing Sheets

(56) References Cited

U.S. PATENT DOCUMENTS

| | | | | |
|---|---|---|---|---|
| 2018/0266172 | A1* | 9/2018 | Wray | E05F 17/004 |
| 2021/0088314 | A1* | 3/2021 | Azhagesan | F41H 5/226 |
| 2021/0302130 | A1* | 9/2021 | Glick | F41H 5/013 |
| 2022/0390211 | A1* | 12/2022 | Adrain | E06B 9/382 |
| 2023/0184518 | A1* | 6/2023 | Glick | F41H 5/24<br>89/36.01 |
| 2023/0304774 | A1* | 9/2023 | Adrain | B32B 27/12 |
| 2023/0408226 | A1* | 12/2023 | Giordano | E04B 2/827 |

* cited by examiner

Fig. 2
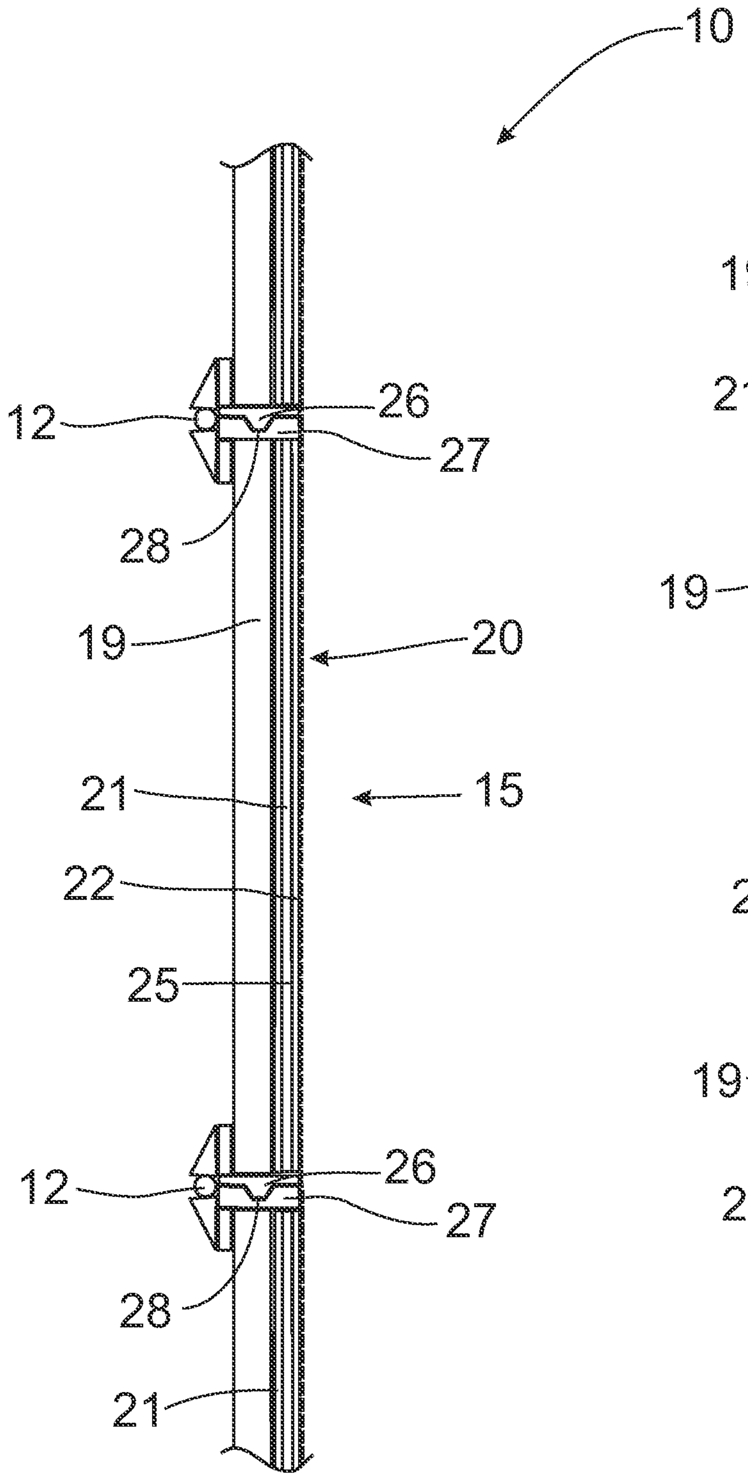
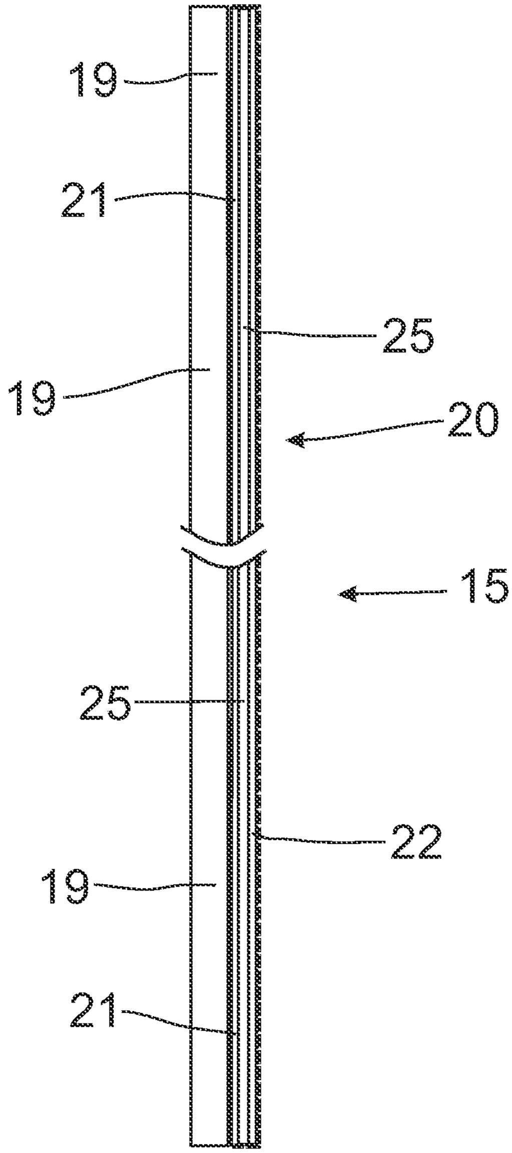
Fig. 3

Fig. 5
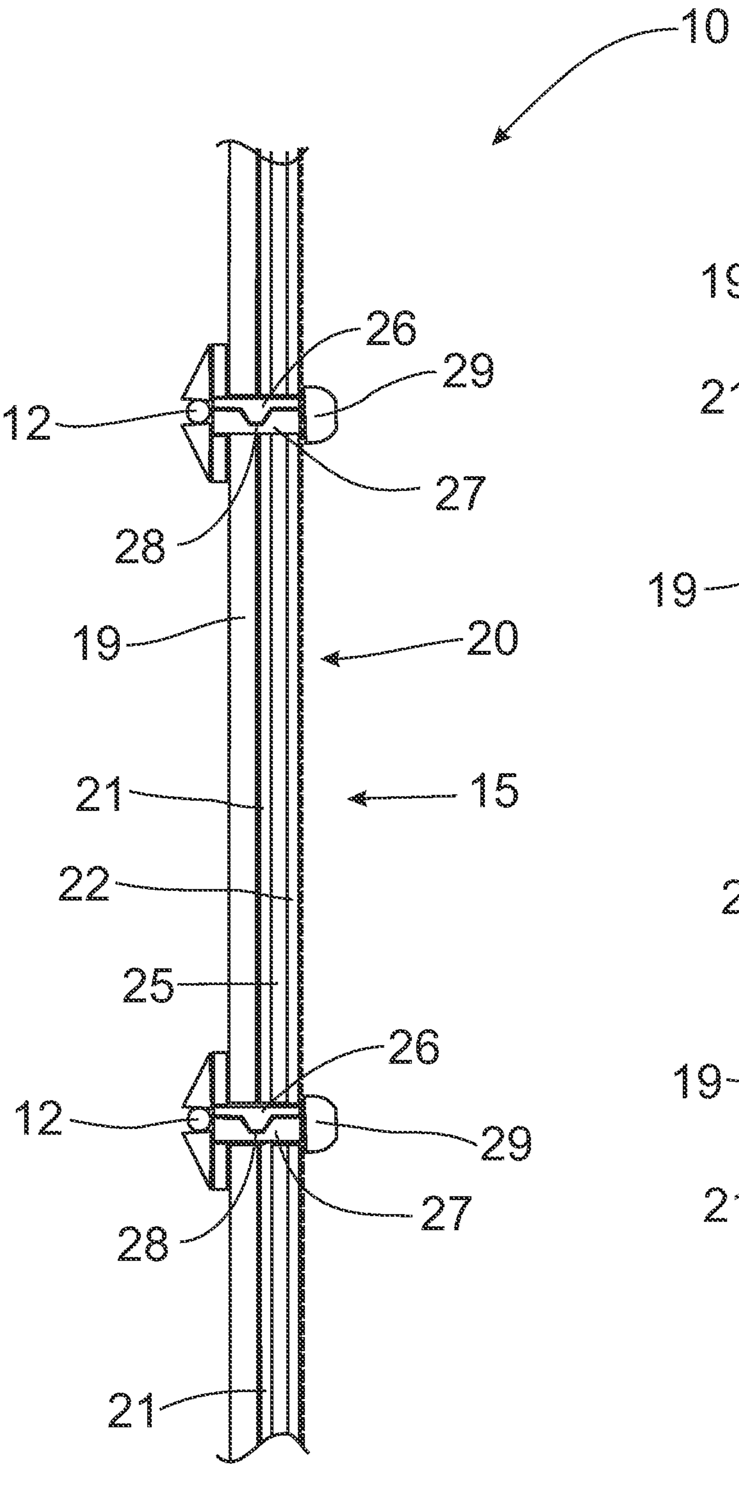
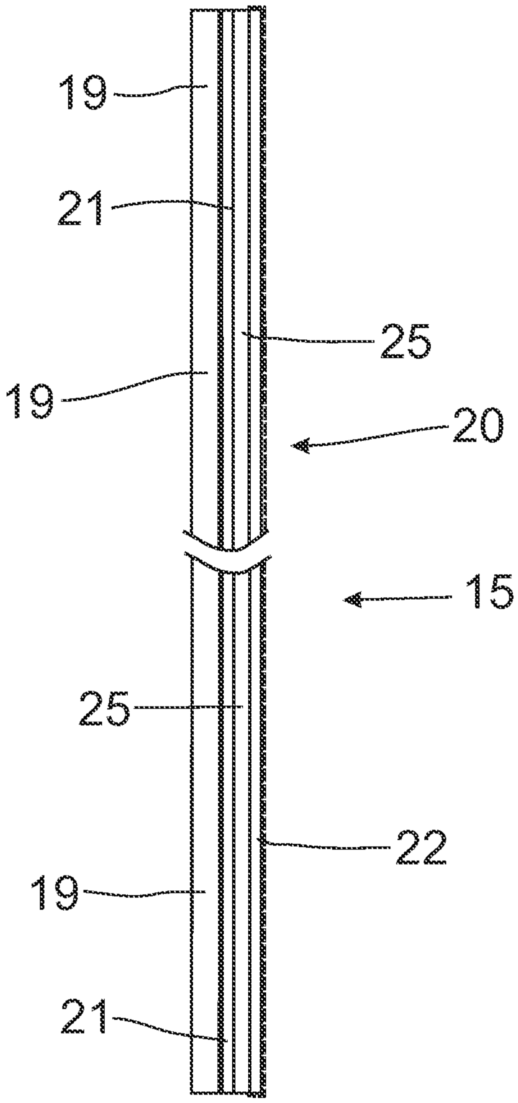
Fig. 6

BULLET RESISTANT GARAGE DOOR ASSEMBLY AND KIT THEREFOR

CROSS-REFERENCE TO RELATED APPLICATIONS

This application is a continuation-in-part application claiming priority on U.S. patent application Ser. No. 17/207,417, filed on Mar. 19, 2021, which in turn claims domestic priority on U.S. Provisional Patent Application Ser. No. 62/994,040, filed on Mar. 24, 2020, the contents of which are incorporated herein by reference.

FIELD OF THE INVENTION

This invention relates generally to a garage door providing security for property and occupants behind the garage door and, more particularly, to a kit to convert a standard garage door into a security garage door that resists penetration through the garage door of bullets up to a predetermined caliber of bullet.

BACKGROUND OF THE INVENTION

Ballistic barriers have been designed and provided to resist and/or prevent the passage of bullets fired at the barrier. Such ballistic barriers have been used at indoor shooting ranges, as security fences for residences and commercial property and other establishments, and as shields for individuals advancing under fire. Ballistic barriers are typically formed of bullet resistant metal and are heavy and difficult to use because of that weight. As security fence structures, the weight of the panels are difficult to install and to maintain.

In U.S. Pat. No. 1,899,735, granted on Jan. 22, 1932, to O. B. McClintock, a security barrier for bank tellers is disclosed in which the barrier is formed from a metal shell supporting bullet resistant glass and a complex structure to provide protection for a bank teller. A modular security fence is disclosed in U.S. Pat. No. 5,429,340, granted on Jul. 4, 1995, to Anthony M. Young, et al, in which the security fence is formed from overlapping panel modules. Each module is formed as an irregularly shaped open shell that interlocks with one or more adjoining modules or shells. Ballistic resistance is a result of opposing outer walls of the open shells when assembled together.

A ballistic barrier is disclosed in U.S. Pat. No. 8,001,880, granted to William C. White, et. al., on Aug. 23, 2011, wherein a lower barrier supports attack resistant panes extending upwardly from the barrier. The lower barrier provides protection from vehicle crashes, while the upper attack resistant panes are formed from material, such as plastic, acrylic and polycarbonates, among others, to resist penetration by bullets, particularly rounds fired by handguns. The ballistic wall structures disclosed in U.S. Patent Publication No. 2015/0354926, published on Dec. 10, 2015, by MGM Holdings, LLC, are designed for use in shooting ranges. The intent of this ballistic wall structure is to retain bullets within the wall structure. A ballistic curtain formed of ballistic rubber allows the passage of a bullet, while slowing the speed of the bullet so that the inner plate 54 stops the penetration of the bullet. The rubber curtain also prevents ricochets and fragments from passing back through the curtain.

Another ballistic barrier is disclosed in U.S. Pat. No. 10,012,479, granted to Michael Boviall on Jul. 3, 2018. This ballistic barrier is formed by a wall incorporating louvers or slats angled and overlapping to provide resistance to the passage of bullets by deflecting the path of the bullets downwardly to the ground. IN an alternative embodiment, the angled slats are backed by a backer plate that serves to further deflect the path of the bullets. A ballistic barrier designed to be portable in discrete panels and assembled in a selected location is disclosed in U.S. Pat. No. 10,281,245, granted on May 7, 2019, to Michael J. DeKort. Each panel can be connected to adjoining panels by hinges, and can, thereby, be folded for portability. Each panel is formed with a single pane of solid metal to provide bullet resistance.

Security doors have also been designed to resist bullet penetration, as can be seen in the security door configuration disclosed in U.S. Pat. No. 9,200,480, granted on Dec. 1, 2015 to Alan P. Deiler. In this Deiler patent, the security door is simply formed with an interior core of steel to resist bullet penetration. If a garage door were constructed according to this disclosed configuration, the garage door would have a tendency for bullets to ricochet from the door, rather than to absorb the energy carried by the bullet striking the garage door. The ricocheting bullet can provide a dangerous situation to other people and property near the garage door being struck by the bullet. As one skilled in the art would readily recognize, allowing a bullet to ricochet is not a desirable performance.

Accordingly, it would be desirable to provide a bullet resistant garage door structure that can absorb energy from a bullet striking the garage door without allowing the bullet to penetrate the structure of the garage door, at least be effective to resist the passage of bullets therethrough up to a predetermined caliber of weapon.

SUMMARY OF THE INVENTION

It is an object of this invention to overcome the disadvantages of the prior art by providing a kit for transforming a standard garage door into a bullet resistant garage door.

It is a feature of this invention that a garage door formed from a thin sheet of steel or aluminum can be converted into a bullet resistant garage door.

It is another object of this invention to create a garage door configuration that will allow bullets to pass through the exterior panel and then be trapped within the interior of the bullet resistant inserts installed on the garage door.

It is an advantage of this invention that the exterior aluminum panel is designed to allow penetration of a bullet while dissipating most of the kinetic energy of the bullet so that the bullet cannot penetrate into the interior of the garage.

It is a feature of this invention that the standard garage door shell has attached thereto a bullet resistant panel formed from a pair of aluminum panels with ballistic material trapped therebetween.

It is another advantage of this invention that the ballistic material can be multiple plies of ballistic fabric, or hardened ballistic resin, or other known ballistic material that can be placed between the two aluminum panels.

It is still another object of this invention to provide a kit to convert a standard garage door configuration into a garage door with bullet resistant characteristics at the joints between vertically spaced garage door panels.

It is still another advantage of this invention that the small gaps between the respective garage door panels are provided with inserts that make the joints between adjacent garage door panels bullet resistant.

It is still another feature of this invention that the joint between adjacent exterior aluminum panels can be covered by a shield that enhances the bullet resistant characteristics of the garage door configuration.

It is yet another feature of this invention that the shield extends below the corresponding exterior aluminum panel to provide bullet resistant characteristics for the garage door as the garage door is being raised to open and adjacent garage door panels pivot relative to one another.

It is still another feature of this invention that the installation of the kit to convert a standard garage door into a bullet resistant garage door does not disturb the exterior outward appearance for the garage door while providing bullet resistant characteristics.

It is another feature of this invention that the ballistic inserts placed behind the exterior shell of the standard garage door can be attached to the exterior shell with a very high bonding adhesive tape.

It is a further object of this invention to provide a kit to convert a standard garage door into a bullet resistant garage door that is durable in construction, carefree of maintenance, easy to assemble, and simple and effective in use.

These and other objects, features and advantages are accomplished according to the instant invention by providing a ballistic garage door assembly and a kit for converting a standard garage door that uses sheets of ballistic material secured to the exterior shell of the standard garage door panels along with inserts at the joints between adjacent garage door panels. Joint inserts applied to the horizontal ends of the garage door panels provide bullet resistant characteristics at the joints. Aluminum sheets with multiple plies of ballistic material between the aluminum sheets are applied to the entire garage door shell. Insulated foam is place on the innermost aluminum sheet to provide additional ballistic performance for the converted garage door. Increased levels of ballistic protection will utilize thicker aluminum panels and an additional external ballistic bumper to increase ballistic performance of the joints between the garage door panels. The outward aesthetic appearance of the garage door does not change appreciably, although a door lift with greater horsepower may be required.

BRIEF DESCRIPTION OF THE DRAWINGS

The advantages of this invention will become apparent upon consideration of the following detailed disclosure of the invention, especially when taken in conjunction with the accompanying drawings wherein:

FIG. 2 is a cross-sectional view of the garage door taken along lines 2-2 of FIG. 1 and forming a Level 3 bullet resistant configuration;

FIG. 3 is a cross-sectional view of the garage door taken along lines 3-3 of FIG. 1 and forming a Level 3 bullet resistant configuration;

FIG. 5 is a cross-sectional view of the garage door taken along lines 2-2 of FIG. 1 and forming a Level 8 bullet resistant configuration;

FIG. 6 is a cross-sectional view of the garage door taken along lines 3-3 of FIG. 1 and forming a Level 8 bullet resistant configuration;

DETAILED DESCRIPTION OF THE PREFERRED EMBODIMENT

Figure 1:
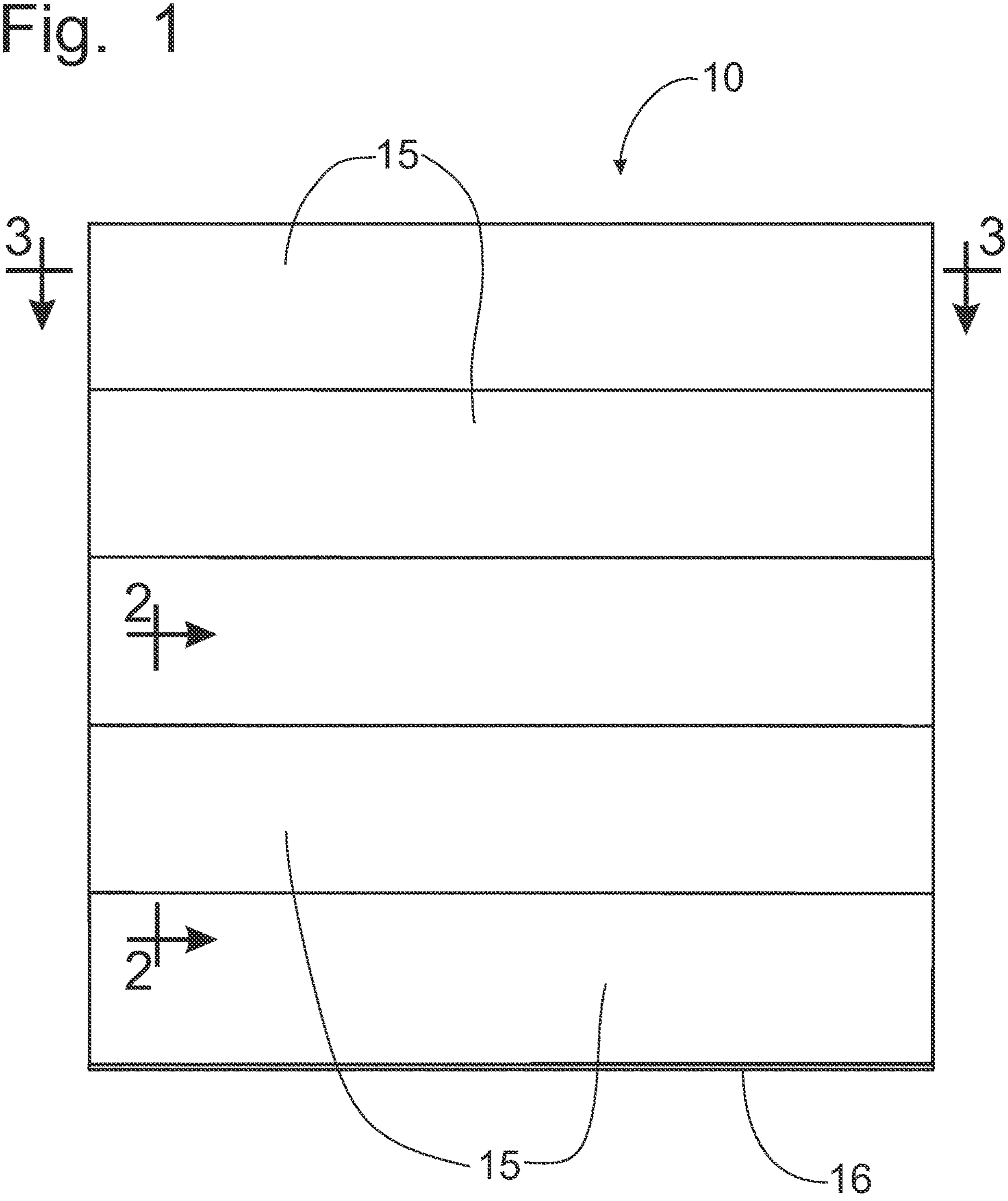
FIG. 1 is a schematic front elevational view of a conventional garage door transformed into a bullet resistant security garage door in a closed orientation and incorporating the principles of the instant invention.
Figure 4:
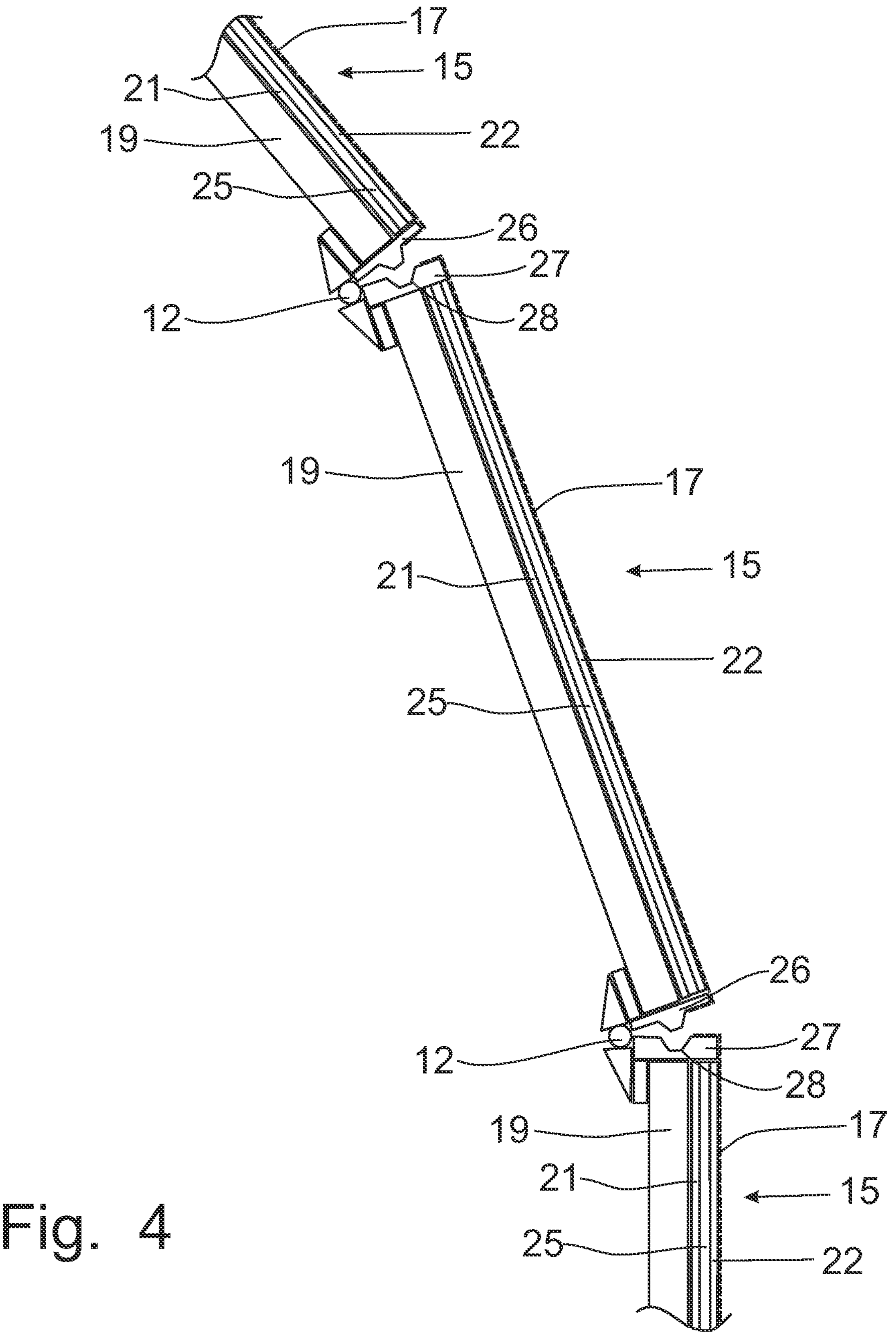
FIG. 4 is a cross-sectional view of the Level 3 bullet resistant garage door depicted in FIG. 2 showing the orientation of the garage door panels being raised, or lowered, relative to the garage door opening.
Figure 7:
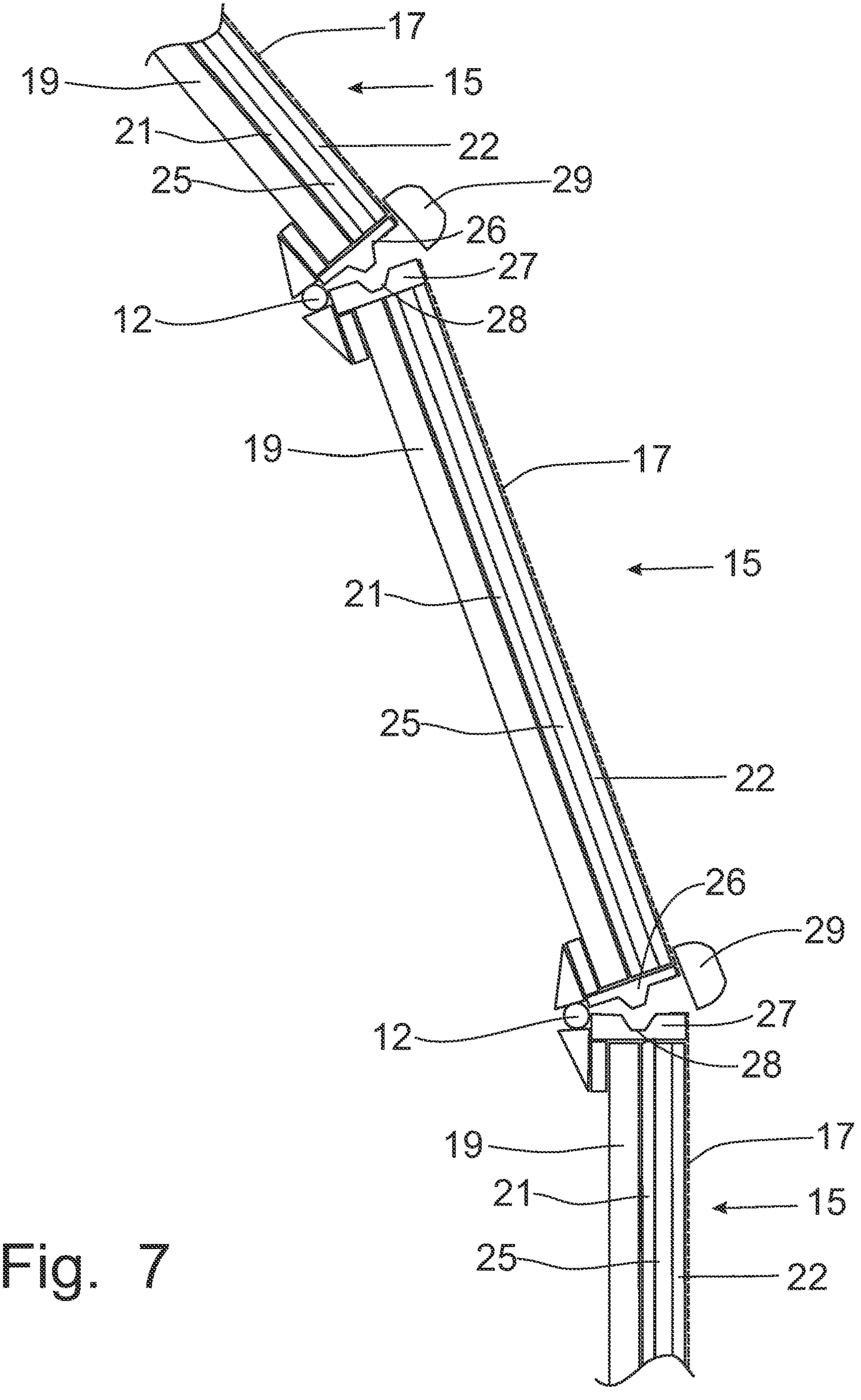
FIG. 7 is a cross-sectional view of the Level 8 bullet resistant garage door depicted in FIG. 5 showing the orientation of the garage door panels being raised, or lowered, relative to the garage door opening.
Figure 8:
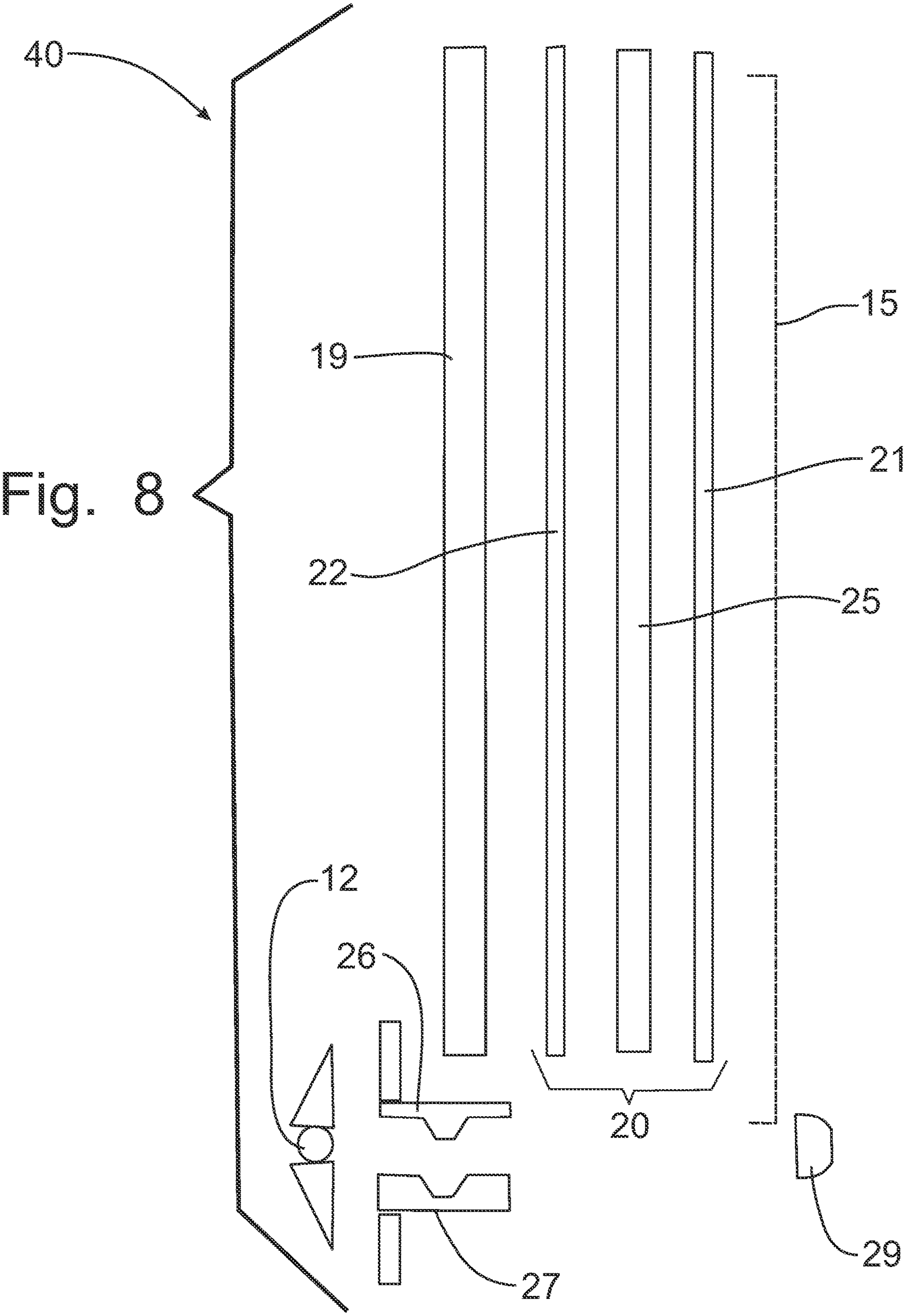
FIG. 8 is an exploded view of the kit used to transform the standard garage door panel into a bullet resistant security garage door.

Referring to the drawings, two embodiments of a standard garage door transformed into a bullet resistant garage door by the application of a kit incorporating the principles of the instant invention can be seen. FIGS. 2-4 depicting a Level 3 bullet resistant configuration and FIGS. 5-7 depicting a Level 8 bullet resistant configuration. The Level 8 configuration is effective to stop a higher caliber bullet than the Level 3 configuration. In general, the conventional garage door 10 is formed from a plurality of horizontally extending panels 15 that are hinged together by hinges 12 to allow the respective panels 15 to pivot relative to one another, as is depicted in FIGS. 6 and 7, to permit raising and lowering of the garage door 10. Also, as is shown in FIG. 1, the garage door 10 will be formed with a conventional elastomeric seal 16 along the bottom edge to seal the garage door 10 against the lower surface of the garage structure (not shown) as is known in the art. The kit 30, best seen in FIG. 8, is applied to the interior side of the conventional garage door panels 15 such that the outward aesthetic appearance of the garage door 10 is not significantly changed.

Each conventional garage door panel 15 is transformed into a bullet resistant garage door panel by applying a ballistic insert 20 to the interior side of the panels 15. This ballistic insert 20 includes a pair of spaced apart 6063 aluminum panels 21, 22, each of which are preferably 5/16 inch thick, separated preferably by multiple plies of ballistic fabric 25. Alternatively, the ballistic insert 20 can include other ballistic materials, such as hardened resin that can be molded to mate with the aluminum panels 21, 22, or other materials that provide the same ballistic characteristics as the ballistic fabric 25. The exterior aluminum panel is preferably secured to the outside metal shell 17 of the conventional garage door panel 15 by very high bonding adhesive tape, such as (VHB) adhesive tape. The ballistic insert 20 is preferably manufactured and assembled offsite and applied to the interior side of the metal shell 17 of each panel 15 as the conventional garage door 10 is transformed.

To provide Level 3 bullet resistance, the number of plies of ballistic fabric placed between the aluminum panels 21, 22 should be in the range of 10-25 layers, depending on the ballistic material used. As such, the ballistic insert 20 is constructed like a sandwich with the aluminum panels 21, 22 on opposing sides of the ballistic fabric 25. To provide a little ballistic resistance and also to provide insulation for the garage door panels 15, a layer of insulated foam 19 is preferably applied to the interior aluminum panel 21 and preferably secured with the high bonding adhesive tape.

To fortify the joints between the respective garage door panels 15, special joint inserts 26, 27 are provided as part of the kit 30 for installation along the vertically spaced edges of the metal shell 17. The joint inserts 26, 27 are formed to be mating with a central wedge portion 28 and mating receptacle that provide bullet resistance due to the stepped configuration as the transformed garage door opens to raise or lower, best seen in FIG. 4. As one of ordinary skill in the art will recognize, the first insert 26 is installed along the entire lower edge of one metal shell 17, and the mating joint insert 27 is installed along the entire upper edge of the immediately adjacent metal shell 17 in a manner that when the garage door 10 is closed to a vertical orientation, the two joint inserts 26, 27 mate and provide bullet resistance along the entire length of the garage door panel 15. The two joint inserts 26, 27 are configured to provide support for the hinge 12 mounted on the interior side of the joint inserts 26, 27.

The Level 8 bullet resistant garage door transformation is substantially the same as described above with respect to the Level 3 bullet resistant configuration. The differences are the thicknesses of the aluminum panels 21, 22, which instead of being 5/16 inch think, would preferably be formed of 6063 aluminum that is 5/8 inch thick. Similarly, the ballistic fabric 25 between the two aluminum panels 21, 22 would have a greater number of plies or layers, preferably in the range of 30-40 layers, depending on the material being used. The layer of insulation foam 19 added to the interior would be reduced in size slight to keep the entire transformation package at approximately the same size, allowing the joint inserts to be the same as with the Level 3 garage door 10.

However, to increase the bullet resistance at the joints between the garage door panels 15, a barrier 29 is added to the exterior of the metal shell 17. The barrier 29 is affixed to the lower edge of each garage door panel 15 in a manner to overlap the joint with the lower adjacent garage door panel 15. As shown in FIG. 7, the overlap of the barrier 29 protects the joint as the two joint inserts 26, 27 separate with the raising of the garage door 10. The barrier 29 is preferably formed of 6063 aluminum of sufficient thickness to provide Level 8 resistance, but could be formed in any shape that will not interfere with the raising of the garage door 10.

The contents of the kit 30 are best seen in the exploded view of FIG. 8. As noted above, the sandwich construction of the ballistic insert 20 is preferably formed and assembled offsite and includes the interior and exterior aluminum panels 21, 22 between which are the multiple plies of ballistic fabric 25. The ballistic insert 20 is sized for the metal shell 17 and attached thereto by high bond adhesive. However, this ballistic insert 20 can be delivered in components and installed as separate pieces secured together by high bond adhesive. Also included are the joint inserts 26, 27 attached to opposing edges of the garage door panels 15 forming the joint. A plurality of hinges 12 can be included in the kit to match with the joint inserts 26, 27. A panel of insulated foam 19 is also provided for attachment to the interior aluminum panel 21.

Once converted by installation of the kit 30, the Level 3 garage door 10 is capable of stopping small caliber bullets, such as from 9 mm and 0.357 caliber hand guns, and even shotguns by using the five-sixteenths thick 6063 interior and exterior aluminum panels 21, 22. The five-eighths thick 6063 interior and exterior aluminum panels 21, 22 form the Level 8 garage door 10 that is capable of stopping bullets fired from most all caliber weapons, except perhaps high powered 0.50 caliber weapons. The function of the exterior aluminum panel 22 is to allow the bullet to penetrate the exterior aluminum panel 22 causing expansion, or flattening, of the bullet, while dissipating much of the ballistic energy the bullet carries with it. The ballistic fabric 25 can then do a better job of stopping the flattened bullet without reaching the interior aluminum panel 21. In the event of a higher velocity or higher caliber bullet, the multiple plies of ballistic fabric 25 dissipate much of the energy, to enable the interior aluminum panel 21 to stop the bullet.

The exterior aluminum panel 22, 24 is not intended to cause a bullet to ricochet or deflect from the exterior aluminum panel 22, 24 as the penetration of the exterior aluminum panel 22, 24 provides a safer bullet resistant configuration. In the event, the bullet is from a small caliber weapon and doesn't have enough energy remaining after penetrating the exterior aluminum panel 22 and the interior core ballistic fabric 25, the slowed small caliber bullet is likely to deflect off the surface of the interior aluminum panel 21, but will not be able to escape the enclosure of the ballistic fabric member 25 between the interior aluminum panels 21 and the exterior aluminum panels 22. The joints between the adjacent garage door panels 15 in the converted garage door 10 are not weak spots with respect to bullet resistance, as is known in prior art structures, due to the use of the joint inserts 26, 27, and the barrier 29.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. For example, 6061 aluminum material can be substituted for the preferred 6063 aluminum material used in the interior and exterior aluminum panels 21-24; however, material thicknesses may require adjustment to maintain the desired bullet resistance capability.

Having thus described the invention, what is claimed is:

1. A kit for transforming a conventional garage door having multiple metal shell panels connected by hinges interconnecting adjacent metal shell panels into a bullet resistant garage door, comprising:

a ballistic panel for attachment to an interior side of each said metal shell, said ballistic panel having a pair of spaced apart rigid panels sized to cover the interior side of each said metal shell with multiple layers of ballistic material being sandwiched between said pair of spaced apart rigid panels and extending from an upper edge of said metal shell to a lower edge of said metal shell.

2. The kit of claim 1 wherein said kit further comprises:

a barrier for mounting on an exterior side of each said metal shell to cover a joint between said metal shell and a lower adjacent metal shell.

3. The kit of claim 1 further including upper and lower joint inserts for attachment to said metal shell along edges of adjacent metal shells to reinforce said hinges.

4. The kit of claim 1 wherein the multiple layers of ballistic material of each said ballistic panel are pressed together.

5. The kit of claim 3 said hinges are mounted on an interior end of corresponding said upper and lower joint inserts.

6. The kit of claim 4 wherein each said rigid panel is formed from 6063 aluminum.

7. A method of converting a conventional garage door having a plurality of metal shells hinged together, comprising the steps of:

mounting a ballistic panel to an interior side of each respective said metal panel formed by multiple layers of ballistic material pressed together and shaped to cover said metal panel from an upper edge to a lower edge.

8. The method of claim 7 wherein mounting step includes securing said ballistic panel to the interior side of each respective metal shell by high bond adhesive.

9. The method of claim 8 wherein each said ballistic panel further includes a pair of spaced apart aluminum plates pressing together said multiple layers of ballistic material.

10. The method of claim 9 further comprising the step of:
installing a pair of mating joint inserts along the adjacent horizontal edges of metal panels on opposing sides of a hinged joint between the metal panels.

11. The method of claim 7 wherein each said pair of opposing joint inserts have mating wedge configurations.

12. The method of claim 7 further comprising the step of:
securing said hinges to an interior side of respective said opposing joint inserts.

13. The method of claim 7 further comprising the step of:
placing a barrier on a lower exterior edge of at least one of metal shells to cover a surface of the corresponding said joint.

14. The method of claim 7 further comprising the step of:
fastening a layer of insulated foam to an interior side of the interior aluminum plate.

15. A garage door having multiple panels each being formed by a metal shell with adjacent metal shells being hinged together, said garage door being converted into a bullet resistant garage door by apparatus, comprising:
a ballistic panel being secured to an interior side of each said metal shell, said metal panel being shaped to cover the entire interior side of each respective metal shell, each said ballistic panel including a pair of spaced apart aluminum plates have ballistic material inserted therebetween;
a first joint insert installed along a lower edge of a first metal shell to extend along an entire length dimension of said first metal shell;
a second joint insert installed along an upper edge of a second metal shell adjacent to and below said first metal shell, said second joint insert mating with said first joint insert along an entire length dimension of said second metal shell; and
hinges mounted on said garage door on an interior side of each adjacent pair of first and second joint inserts.

16. The garage door of claim 15 wherein a barrier is secured to a lower exterior edge of each said metal shell such that said barrier covers said first and second joint inserts when said garage door is in a vertical closed orientation.

17. The garage door of claim 15 wherein said corresponding first and second joint inserts are formed with a mating wedge configuration.

18. The garage door of claim 15 wherein ballistic material positioned between said aluminum plates comprises multiple layers of ballistic fabric.

19. A method of creating a conventional garage door having a plurality of metal shells hinged together to form a joint between said metal shells, comprising the steps of:
mounting a ballistic panel to an interior side of each respective said metal panel, said ballistic panel being shaped to cover said metal panel from an upper edge to a lower edge.

20. The method of claim 19 wherein said ballistic panel is formed from multiple layers of ballistic material pressed together.

21. The method of claim 19 further comprising the step of:
placing a barrier on a lower exterior edge of at least one of metal shells to cover a surface of the corresponding said joint.

22. A garage door having multiple panels each being formed by a metal shell with adjacent metal shells being hinged together, comprising:
a ballistic panel being secured to an interior side of each said metal shell, said ballistic panel being shaped to cover the entire interior side of each respective metal shell,;
a first joint insert installed along a lower edge of a first metal shell to extend along an entire length dimension of said first metal shell;
a second joint insert installed along an upper edge of a second metal shell adjacent to and below said first metal shell, said second joint insert mating with said first joint insert along an entire length dimension of said second metal shell; and
hinges mounted on said garage door on an interior side of each adjacent pair of first and second joint inserts.

23. The method of claim 22 wherein each said ballistic panel includes a pair of spaced apart aluminum plates having ballistic material inserted therebetween.

24. The garage door of claim 22 wherein a barrier is secured to a lower exterior edge of each said metal shell such that said barrier covers said first and second joint inserts when said garage door is in a vertical closed orientation.

* * * * *